US008804621B2

(12) United States Patent
Kim et al.

(10) Patent No.: US 8,804,621 B2
(45) Date of Patent: Aug. 12, 2014

(54) DATA TRANSMITTING METHOD USING MACHINE TYPE COMMUNICATION GROUP BASED TUNNELING, AND MOBILE COMMUNICATION SYSTEM USING THE SAME

(75) Inventors: Chang Ki Kim, Daejeon (KR); Jae Sheung Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 152 days.

(21) Appl. No.: 13/332,059

(22) Filed: Dec. 20, 2011

(65) Prior Publication Data

US 2012/0155391 A1 Jun. 21, 2012

(30) Foreign Application Priority Data

Dec. 21, 2010 (KR) ........................ 10-2010-0132000

(51) Int. Cl.
*H04W 4/00* (2009.01)

(52) U.S. Cl.
USPC ......................... 370/328; 370/395.2; 370/463

(58) Field of Classification Search
None
See application file for complete search history.

(56) References Cited

U.S. PATENT DOCUMENTS

2010/0027541 A1 2/2010 Eriksson et al.
2011/0161503 A1* 6/2011 Krebs .......................... 709/227

FOREIGN PATENT DOCUMENTS

KR 1020040022696 3/2004

OTHER PUBLICATIONS

3GPP, TS 23.401 V8.11.0, Sep. 2010, 3GPP.*
3GPP, TR 23.888 V1.0.0, Jul. 2010, 3GPP.*
InterDigital Communication Corporation, "Group Based Access Procedures," 3GPP TSG SA WG2 Meeting #78, TD S2-101101 (2010).
Panasonic, "Signalling congestion control for MTC Groups," 3GPP TSG SA WG2 Meeting #79, TD S2-102285 (2010).

* cited by examiner

*Primary Examiner* — Alex Skripnikov
(74) *Attorney, Agent, or Firm* — Nelson Mullins Riley & Scarborough LLP

(57) ABSTRACT

A data transmission method is disclosed. A data transmission method for at least one machine type communication (MTC) device constituting an MTC group includes receiving an attach request from the MTC device; determining whether the attach request is a first attach request from the MTC group; and if it is determined that the attach request is a first attach request from the MTC group, establishing a downlink tunnel and an uplink tunnel to be used for data transmission and reception between a GW and a base station using an MTC group identity.

15 Claims, 5 Drawing Sheets

DATA TRANSMITTING METHOD USING MACHINE TYPE COMMUNICATION GROUP BASED TUNNELING, AND MOBILE COMMUNICATION SYSTEM USING THE SAME

CLAIM FOR PRIORITY

This application claims priority to Korean Patent Application No. 10-2010-0132000 filed on Dec. 21, 2010 in the Korean Intellectual Property Office (KIPO), the entire contents of which are hereby incorporated by reference.

BACKGROUND

1. Technical Field

Example embodiments of the present invention relate in general to a mobile communication system including a 3GPP Long Term Evolution (LTE)/Service Architecture Evolution (SAE) system, and more specifically to a data transmission method using machine type communication (MTC) group based tunneling that is related to a processing technique for group tunneling between a base station and a gateway based on a MTC group in data transmission and reception to and from a MTC device, and a mobile communication system using the same.

2. Related Art

MTC or machine-to-machine (M2M) communication is a form of data communication which involves one or more entities that do not necessarily need human interaction. A service optimized for MTC differs from a service optimized for human-to-human communication. In comparison with a current mobile network communication service, the MTC service can be characterized by a) several market scenarios, b) data communications, c) lower cost and less effort, d) a potentially very large number of communicating terminals, e) a wide service area, and f) very low traffic per terminal.

MTC may appear in a variety of service forms, such as smart metering, tracking and tracing, remote maintenance and control, eHealth and the like.

In current 3GPP, evolved Long Term Evolution (LTE)/Service Architecture Evolution (SAE) systems that are greatly improved in transmission efficiency and use efficiency compared to existing UMTS systems are being developed, and a standardization task for new network architecture for supporting machine type MTC involving MTC devices rather than existing person-friendly terminals and network improvement for MTC (NIMTC) is being conducted.

In 3GPP, an NIMTC task is being conducted in consideration of features of the MTC in existing network architecture. As part of this effort, there are attempts to resolve problems of congestion and overload by eliminating unnecessary signaling and performing group control through group optimization for MTC devices. Currently, the directivity for solutions has only been established, and concrete solutions have not yet been specifically discussed.

Since it is expected that there are about 100 times more MTC devices than existing terminals and MTC devices in a number of MTC applications have a feature of periodic simultaneous access, all MTC devices performing a procedure for access to the same network as a network for general terminals may cause congestion and overload of the network, which not only fatally affects existing person-friendly terminal based services, but also degrades resource efficiency of the network.

Furthermore, in terms of operation in the network, the same procedure as a procedure for general person-friendly terminals being performed for a number of MTC devices having similar service features may cause waste of resources and overload of the overall network.

SUMMARY

Accordingly, Example embodiments of the present invention are provided to substantially obviate one or more problems due to limitations and disadvantages of the related art.

Example embodiments of the present invention provide a data transmission method using machine type communication (MTC) group based tunneling that not only reduces additional signaling procedures that are unnecessary for MTC communication, but also conserves resources and reduces overload of a system in actual user traffic transmission by creating a GTP-U tunnel for an MTC device between an S-GW and a base station for each MTC group using MTC group based features, which reduces congestion and overload of the network, in order to resolve a problem that may be caused by a signaling procedure of the MTC device being the same as that of an existing person-friendly terminal (UE) in a Long Term Evolution (LTE) network including MTC entities for MTC communication that uses an existing E-UTRAN, a mobility management entity (MME)/gateway (GW), and MTC devices, and a mobile communication system using the same.

In some example embodiments, a data transmission method for at least one MTC device constituting a MTC group includes: receiving an attach request from the MTC device; determining whether the attach request is a first attach request from the MTC group; and if it is determined that the attach request is a first attach request from the MTC group, establishing a downlink tunnel and an uplink tunnel to be used for data transmission and reception between a GW and a base station using a MTC group identity.

The establishing of the downlink tunnel and the uplink tunnel may include: transmitting, by a mobility management entity receiving the attach request from the MTC device, a session creation request message including the MTC group identity to the GW; creating, by the GW receiving the session creation request message, a bearer context for the MTC device; and if a session creation request from the MTC device is a first session creation request from the MTC group, allocating, by the GW, a MTC group tunnel identity for uplink data transmission.

The establishing of the downlink tunnel and the uplink tunnel may include: transmitting, by a mobility management entity, a session creation request message to the GW in response to the attach request from the MTC device and receiving a session creation response message from the GW; transmitting, by the mobility management entity, an initial context setup request message including the MTC group identity to the base station; and allocating, by the base station, a MTC group tunnel identity for downlink data transmission using the MTC group identity included in the initial context setup request message.

The data transmission method may further include: receiving, by the mobility management entity, an initial context setup response message from the base station and receiving an attach completion message from the MTC device; if the attach request from the MTC device is a first attach request from the MTC group, transmitting, by the mobility management entity, a bearer modification request message to the GW; and updating, by the GW receiving the bearer modification request message, the MTC group tunnel identity for downlink data transmission and an address of the base station.

The data transmission method may further include: determining, by the mobility management entity receiving an attach request message from the MTC device, whether MTC group tunneling is to be used based on information included in the attach request message or previously set information indicating whether group tunneling is to be used according to the MTC group.

The data transmission method may further include: tunneling use indicator according to whether the MTC group tunneling is to be used; inserting, by the mobility management entity, the set MTC group tunneling use indicator into a session creation request message and a bearer modification message and transmitting the session creation request message and the bearer modification message to the GW; and allocating a MTC group tunnel identity for uplink data transmission or updating a MTC group tunnel identity for downlink data transmission, by the GW, according to the MTC group tunneling use indicator included in the session creation request message and the bearer modification message.

The data transmission method may further include: setting, by the mobility management entity, a MTC group tunneling use indicator according to whether the MTC group tunneling is to be used; inserting, by the mobility management entity, the set MTC group tunneling use indicator into an initial context setup request message and transmitting the initial context setup request message to the base station; and allocating, by the base station, a MTC group tunnel identity for downlink data transmission according to the MTC group tunneling use indicator included in the initial context setup request message.

According to an example embodiment of the present invention, the uplink tunnel and the downlink tunnel may comprise GPRS tunneling Protocol for the user plane (GTP-U) tunnels established between the GW and the base station for each MTC group.

The data transmission method may further include: if it is determined that the attach request is not a first attach request from the MTC group, using a previously set MTC group tunnel identity for the MTC group.

In other example embodiments, a mobile communication system including at least one MTC device constituting a MTC group and providing a MTC service, includes: the at least one MTC device configured to transmit an attach request to a network; a mobility management entity configured to transmit a session creation request message including a MTC group identity to a GW, transmit an initial context setup request message including the MTC group identity to a base station, and transmit a bearer modification request message to the GW if the attach request from the MTC device is a first attach request from the MTC group; and the GW configured to receive the session creation request message from the mobility management entity and allocate a MTC group tunnel identity for uplink data transmission if the session creation request is a first session creation request from the MTC group, and to receive the bearer modification request message from the mobility management entity and update a MTC group tunnel identity for downlink data transmission.

The mobile communication system may further include: the base station configured to allocate the MTC group tunnel identity for downlink data transmission using the MTC group identity included in the initial context setup request message received from the mobility to management entity.

In still other example embodiments, a mobility management entity located in a mobile communication system including at least one MTC device constituting a MTC group and providing a MTC service receives a network attach request from the at least one MTC device, transmits a session creation request message including a MTC group identity to a GW, transmits an initial context setup request message including the MTC group identity to a base station, and transmits a bearer modification request message to the GW if the attach request from the MTC device is a first attach request from the MTC group.

The mobility management entity may set a MTC group tunneling use indicator according to whether the MTC group tunneling is to be used, insert the set MTC group tunneling use indicator in a session creation request message and a bearer modification message to transmit the session creation request message and the bearer modification message to the GW, and insert the set MTC group tunneling use indicator into an initial context setup request message to transmit the initial context setup request message to the base station.

The mobility management entity may determine whether MTC group tunneling is to be used based on information included in the attach request message received from the MTC device or previously set information indicating whether group tunneling is to be used according to the MTC group.

In still other example embodiments, a GW apparatus located in a mobile communication system including at least one MTC device constituting a MTC group and a mobility management entity and providing a MTC service receives a session creation request message from the mobility management entity, and allocates a MTC group tunnel identity for uplink data transmission if the session creation request is a first session creation request from to the MTC group, and the GW apparatus receives a bearer modification request message from the mobility management entity and updates a MTC group tunnel identity for downlink data transmission and an address of a base station.

The GW apparatus may serve as both a serving GW and a packet data network (PDN) GW.

The GW apparatus may allocate the MTC group tunnel identity for uplink data transmission or update the MTC group tunnel identity for downlink data transmission according to the MTC group tunneling use indicator included in the session creation request message and the bearer modification message.

According to the configuration of the present invention, it is possible to perform efficient signaling and reduce overload of a system by establishing and using only one tunnel for an MTC group including at least one MTC device to reduce unnecessary signaling in access procedures for other MTC devices in the group. Further, as a time taken to search for a tunnel for packet transmission in actual user traffic transmission is greatly shortened, it is possible to prevent congestion and overload of the network caused by the MTC devices and conserve resources of the system.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS OF THE PRESENT INVENTION

Figure 1:
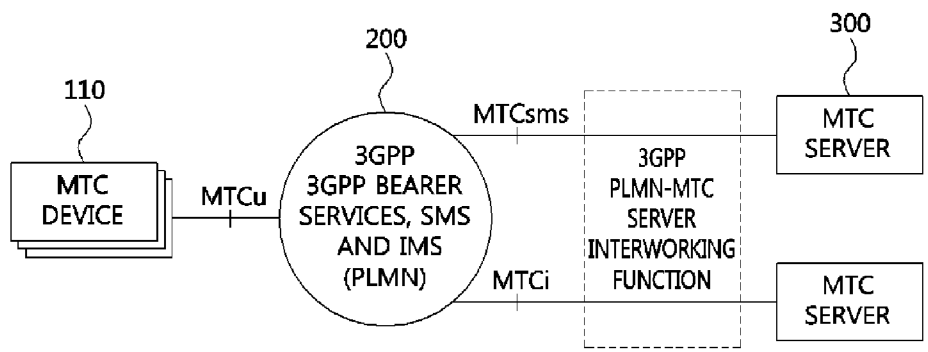
FIG. 1 illustrates architecture of a 3GPP wireless communication network providing a machine type communication service to which the present invention is applied.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A "terminal" used in this disclosure may be referred to as mobile station (MS), user equipment (UE), user terminal (UT), wireless terminal, access terminal (AT), terminal, subscriber unit, subscriber station (SS), wireless device, wireless communication device, wireless transmit/receive unit (WTRU), mobile node, mobile or the like. Various example embodiments of the terminal may include a cellular telephone, a smart phone having a wireless communication function, a personal digital assistant (PDA) having a wireless communication function, a wireless modem, a portable computer having a wireless communication function, a photographing device such as a digital camera having a wireless communication function, a gaming device having a wireless communication function, a music storage and playback appliance having a wireless communication function, an Internet appliance having wireless Internet accessing and browsing functions, and a portable unit or terminal having a combination of such functions, but are not limited thereto.

A "base station" used in this disclosure generally refers to a stationary point that communicates with a terminal. The base station may be referred to as node-B, eNode-B, a base transceiver system (BTS), an access point, or the like.

FIG. 1 illustrates architecture of a 3GPP wireless communication network providing a machine type communication (MTC) service to which the present invention is applied.

Referring to FIG. 1, the 3GPP wireless communication network providing a MTC service includes MTC servers 300 for providing MTC service, MTC devices 110, and MTC users, in addition to an existing wireless communication network including general terminals.

The MTC servers 300 may or may not be included in an area of a mobile communication network operator. When the MTC server 300 is controlled by the network operator, the network operator provides an application programming interface (API) to the MTC server and the MTC user accesses the MTC server 300 of the network operator via the API.

The MTC device 110 communicates with the MTC server or the other MTC devices using 3GPP bearer services, SMS and an IP multimedia subsystem (IMS) provided in a mobile network (public land mobile network: PLMN) 200. The MTC device 110 is also connected with a 3GPP network (e.g., UTRAN, E-UTRAN or GERAN) via an MTCu interface. The MTC server 300 performs services for MTC users and is connected with the 3GPP network via an MTCsms or MTCi interface.

An MTC subscriber is an entity that provides services to one or more MTC devices using the network operator, and an MTC user is a user entity that uses the services provided by the MTC server. In 3GPP, an MTCu interface is based on Uu, Um or LTEu, and MTCi to is based on Gi or SGi.

According to TS23.888, it is expected that there are about 100 times more MTC devices than existing general terminals and MTC devices have various application fields. Accordingly, the MTC devices are expected to have a great influence on a mobile communication network mainly with existing person-friendly terminals (or user equipments). Accordingly, in 3GPP, primary features of MTC communication are classified and, for example, network improvement for MTC (NIMTC) is reflected in standardization of each feature.

The MTC feature refers to a function of changing an existing network to optimize the existing network for MTC application service. The primary features of the MTC communication include control of overload due to simultaneous access of a number of terminals, monitoring of MTC devices, group based optimization of the MTC devices, and the like. For other features, refer to TS23.368 to TR23.888.

Specifically, MTC group based optimization is defined in TS22.368 or TR23.888 as follows.

An MTC group refers to a group of MTC devices that belong to the same MTC subscriber and share one or more group based MTC features. The group based MTC features refer to MTC features equally applied to one MTC group.

An operator may differently apply control, management or charging to each group, as necessary. In particular, in order to avoid the congestion and the overload due to a number of MTC devices, which is one primary issue of MTC, unnecessary signaling can be reduced and resources of the network can be conserved through group based optimization. For example, a method of limiting a maximum data transmission rate for each group may be used.

Figure 2:
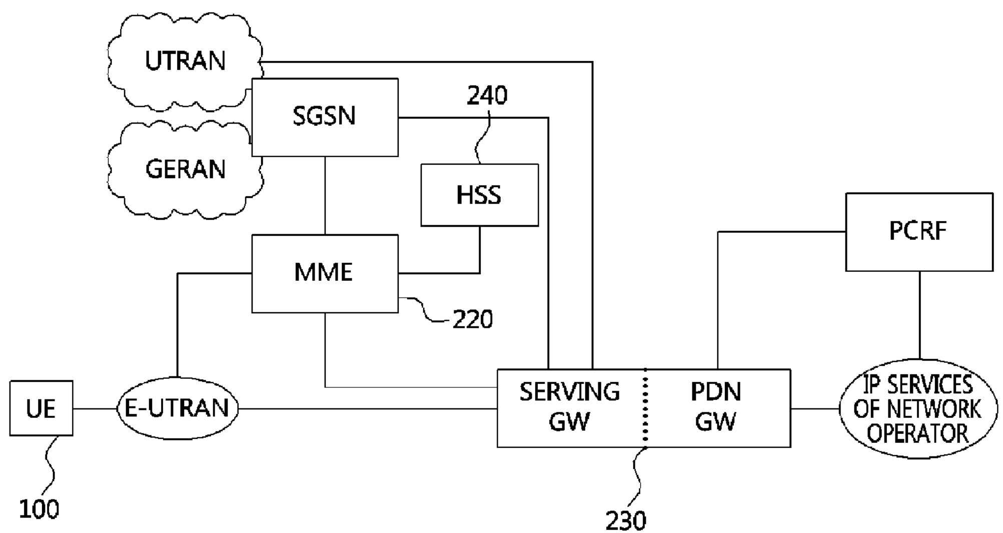
FIG. 2 illustrates architecture of a mobile communication network to which the present invention is applied.

FIG. 2 illustrates architecture of a mobile communication network to which the to present invention is applied.

That is, FIG. 2 illustrates an example of the PLMN shown in FIG. 1. Architecture of an existing Long Term Evolution (LTE)/System Architecture Evolution (SAE) network defined in the 3GPP standard is shown.

LTE/SAE networks may be largely classified into evolved-UTRAN (E-UTRAN) and evolved packet core (EPC).

GERAN and a UTRAN are existing 3GPP systems proposed earlier than the E-UTRAN. The GERAN includes a GSM/GPRS/EDGE system and the UTRAN includes a WCDMA/HSDPA/HSUPA system. A serving GPRS supporting node (SGSN) is responsible for management and support of packet switching service directed to a wireless access network.

The E-UTRAN is located at end points of a terminal (user equipment) and a base station network and connected to an EPC, which is connected to an external network. Here, the E-UTRAN includes a base station according to an example embodiment of the present invention.

The EPC may include a mobility management entity (MME) for managing mobility of the terminal, and a gateway (GW) 230 responsible for data traffic transmission between the external network and the E-UTRAN. GWs may be functionally classified into serving GWs (S-GWs) and packet data network (PDN) GWs (P-GWs).

According to the 3GPP standard, the S-GW and the P-GW are defined to be physically embodied in the same entity or different entities. In an example embodiment of the present invention, the S-GW and the P-GW are assumed to be embodied in the same entity for convenience of explanation.

A policy control and charging rules function (PCRF) connected with the GW 230 is responsible for a PCRF.

Meanwhile, when an MTC service is to be provided using the PLMN network shown in FIG. 2, a subscriber must be registered in the network and a default bearer for user traffic must be set even for the MTC device through an access procedure, which is an initial signaling procedure for an existing person-friendly terminal after being powered on.

Figure 3:
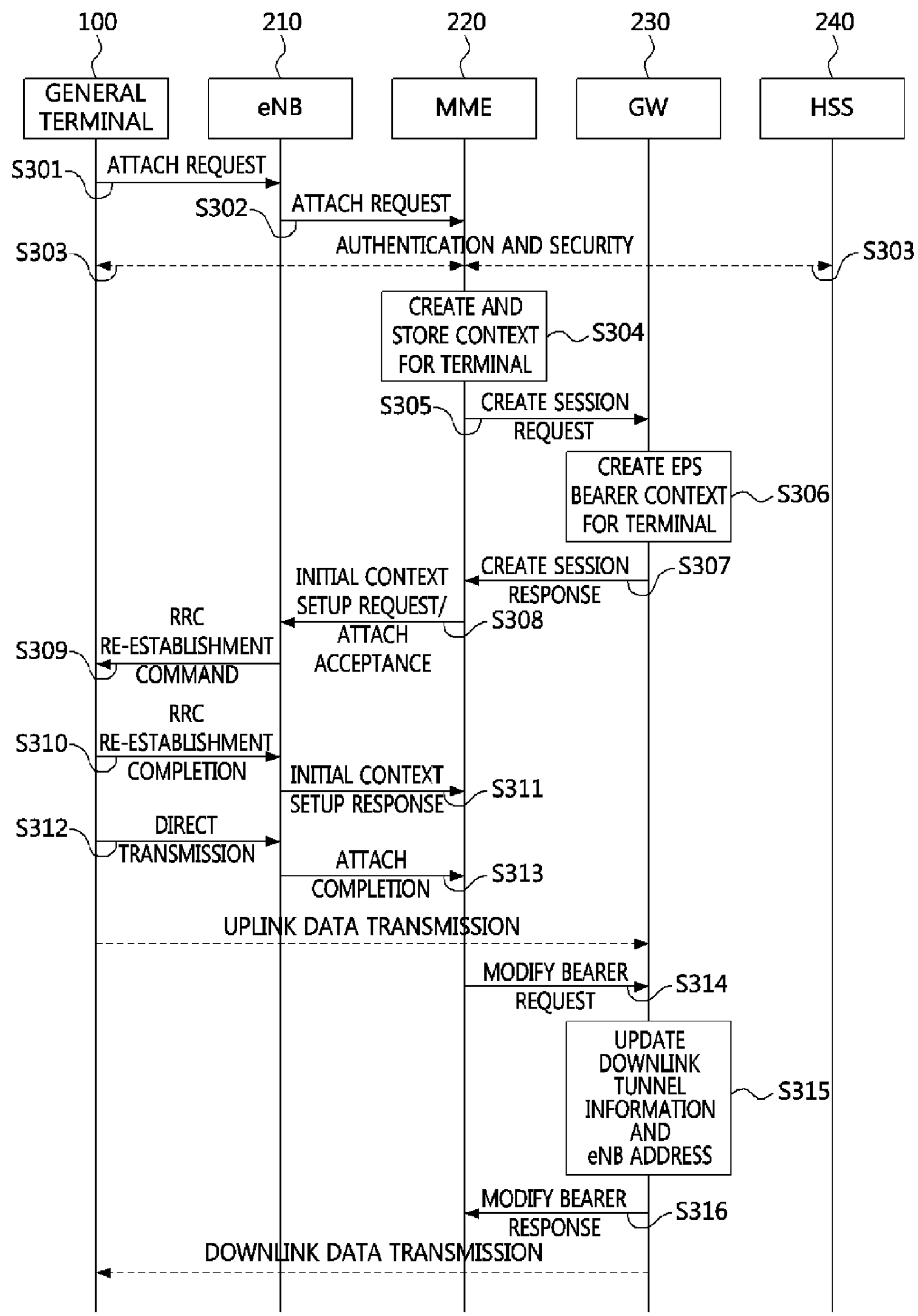
FIG. 3 illustrates an access procedure for a general person-friendly terminal (UE) in a 3GPP LTE network to which the present invention is applied.

FIG. 3 illustrates an access procedure for a general person-friendly terminal (UE) in a 3GPP LTE network to which the present invention is applied.

As shown in FIG. 3, a general terminal 100 transmits an attach request to an MME 220 via an eNB 210 for registration in a network after initially being powered on (S301 and S302).

The MME 220 receiving the attach request performs an authentication and security procedure on the terminal making the attach request using an international mobile subscriber identity (IMSI) (S303). For the terminal determined to be normal through the authentication and security procedure, the MME 220 creates and stores context information for mobility management of the terminal (S304). The MME 220 then transmits a session creation request (Create Session Request) message to a GW 230 using GTP-C protocol for default bearer creation (S305).

The GW 230 receiving the session creation request message creates evolved packet system (EPS) bearer context information for the terminal based on the IMSI (S306). That is, the GW 230 allocates a tunnel identity (TEID) of a default bearer for uplink (UL) user traffic transmission between the eNB and the GW, allocates a terminal IP address, and creates a packet filter table (PFT) to create an EPS bearer context for the terminal.

The GW 230 then transmits a session creation response (Create Session Response) message to the MME 220 in response to the session creation request from the MME 220 (S307). The MME 220 receiving the session creation response message receives a downlink tunnel identity using SLAP protocol between the eNB and the terminal, and the eNB delivers a non-access stratum (NAS) message between the MME 220 and the terminal using RRC protocol (S308 to S313).

In other words, if the MME 220 receiving the session creation response message from the GW transmits an initial context setup request/attach acceptance message to the eNB (S308), the eNB transmits a RRC re-establishment command to the terminal (S309). The eNB 210 receiving an RRC re-establishment completion message from the terminal (S310) transmits an initial context setup response message to the MME 220 (S311). Then, the terminal transmits a direct transmission message including an attach completion message to the eNB 210 (S312), and the eNB 210 delivers the direct transmission message to the MME 220 (S313).

The MME 220 receiving the attach completion (S313) includes a DL GTP-U tunnel identity of the default bearer and an address of the eNB 210 received through the initial context setup response message from the eNB 210 (S311) in a bearer modification request (Modify Bearer Req) message, and transmits the bearer modification request message to the GW 230 (S314). Here, GTP-U refers to GPRS tunneling protocol for a user plane and serves to tunnel user data between the eNB and the GW.

The GW 230 receiving the bearer modification request message updates the downlink tunnel identity of the default bearer and the eNB address that have been previously created by the session creation request message (S305) in S315. The GW 230 then transmits a bearer modification response message to the MME 220 (S316).

The access procedure based on person-friendly terminals described with reference to FIG. 3 is an essential procedure for all terminals.

However, of MTC devices for MTC do not have a voice communication function of existing terminals, and there is a feature in which a number of MTC devices performing similar functions simultaneously access a network.

In addition, there are more MTC devices than existing general terminals and there is a feature of periodic simultaneous access of MTC devices in a number of MTC applications (e.g., applications such as, particularly, health monitoring and water metering). Accordingly, the access procedure for the general terminal in FIG. 3 being performed for all the MTC devices causes congestion and overload of the network, which may not only fatally affect existing person-friendly terminal based services, but also degrade resource efficiency of the network.

Further, a method of creating a GTP-U tunnel between the S-GW and the eNB and creating a tunnel for bearer-specific traffic for each of a great number of MTC devices having similar service features, similar to an existing general terminal that is a person-friendly terminal, may cause resource waste in the GW system and overload of the overall network.

Figure 4:
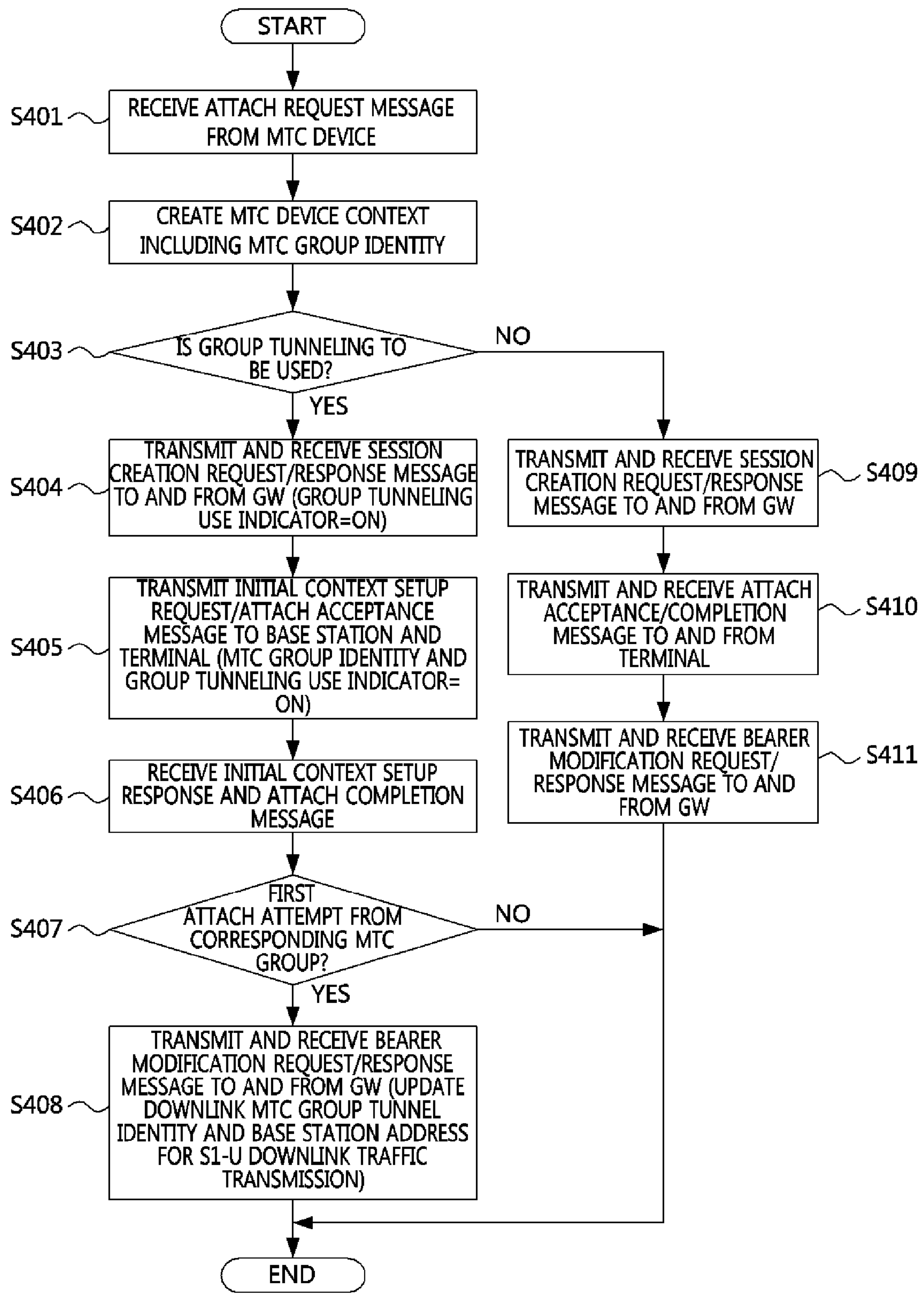
FIG. 4 illustrates an operation flow of an MTC group tunneling processing procedure in an MME of a mobile communication system according to an example embodiment of the present invention.
Figure 5:
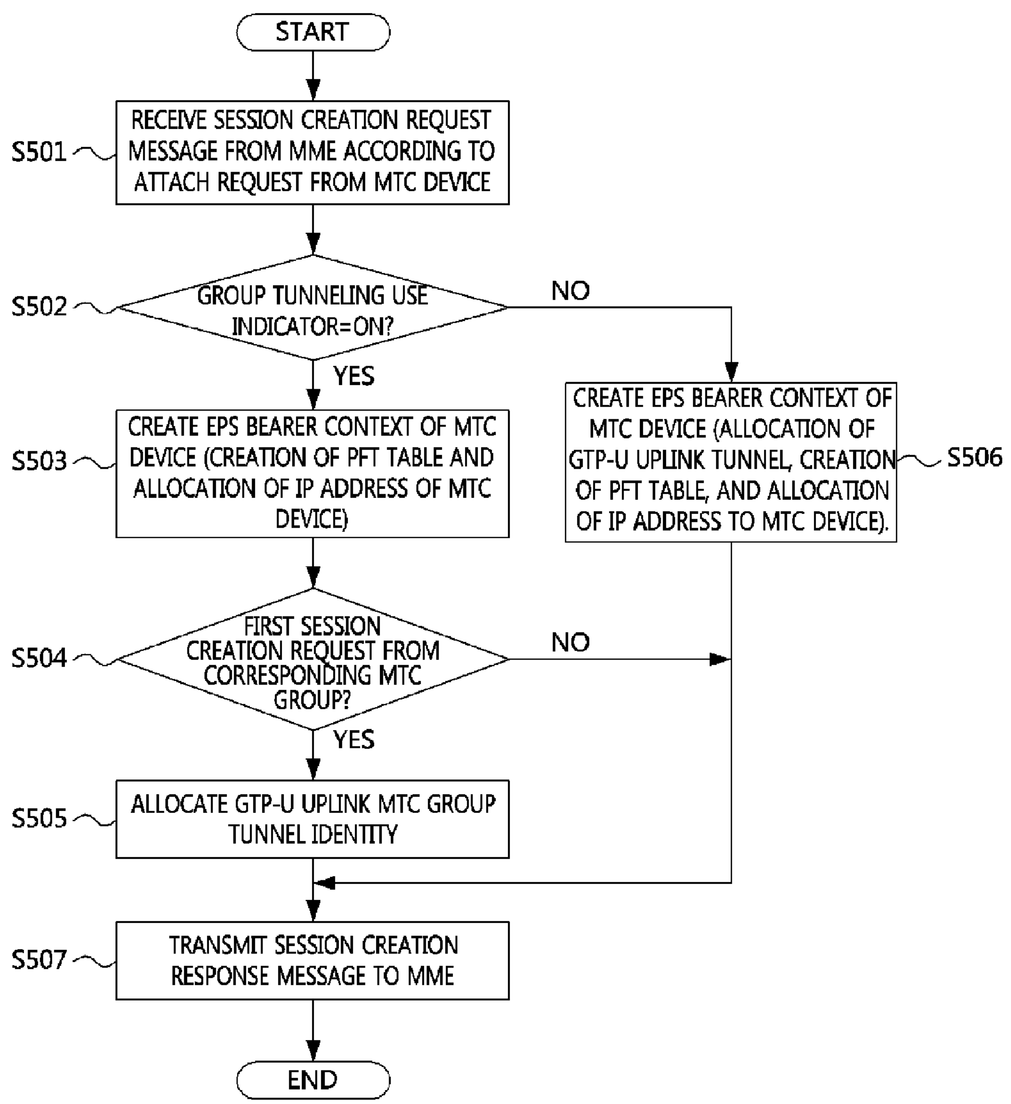
FIG. 5 illustrates a group tunneling processing procedure for an MTC device in a gateway (GW) of a mobile communication system and an initial operation procedure according to an attach request from the MTC device in a data transmission method according to an example embodiment of the present invention.
Figure 6:
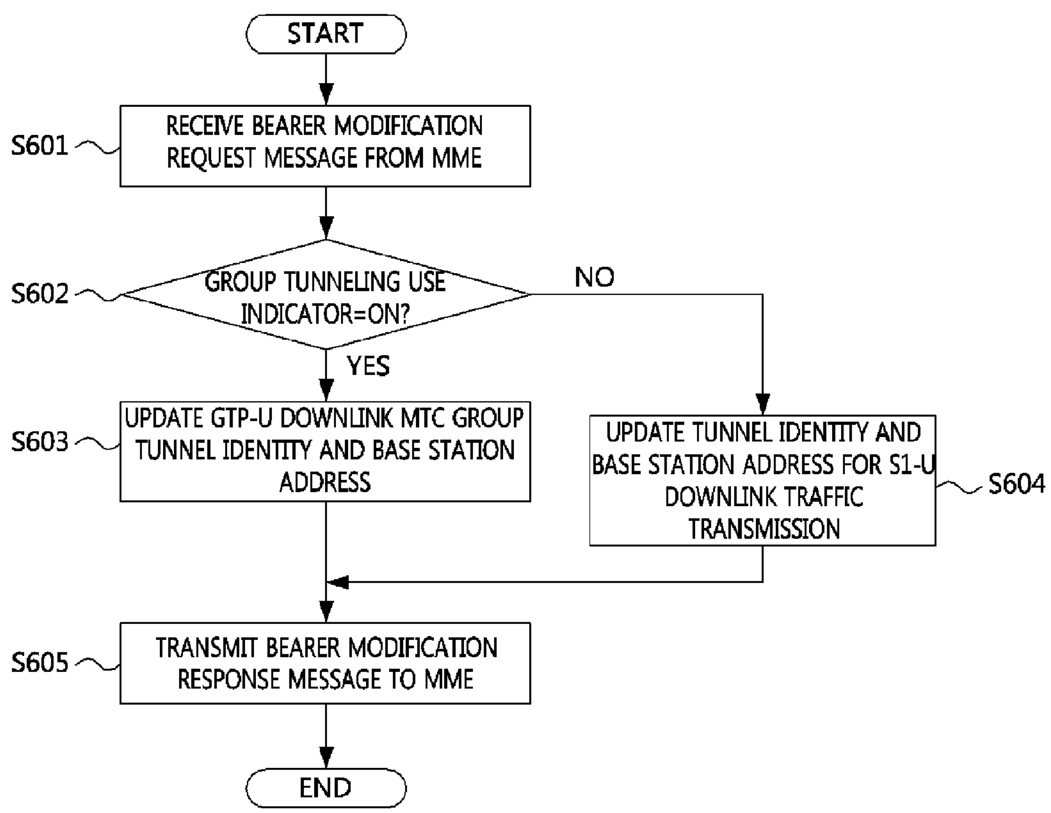
FIG. 6 illustrates a group tunneling processing procedure for an MTC device in the GW of a mobile communication system and an operation procedure according to a bearer modification request from an MME in a data transmission method according to an example embodiment of the present invention.

Accordingly, in an example embodiment of the present invention, a tunneling processing method as shown in FIGS. 4 to 6 is proposed as a scheme for resolving such a problem.

FIG. 4 illustrates an operation flow of an MTC group tunneling processing procedure in an MME of a mobile communication system according to an example embodiment of the present invention.

As shown in FIG. 4, when an attach request message is received from an MTC device in an access process (S401), the MME creates an MTC device context including an MTC group identity included in the attach request message (S402).

The MME 220 determines whether MTC group tunneling is to be used based on information included in the attach request message or a previously set information indicating whether group tunneling is to be used according to the MTC group (S403).

If it is determined that MTC group tunneling is not used for the MTC device making the attach request ("No" in S403), the MME 220 sets the MTC group identity and the MTC group tunneling use indicator to OFF, includes the MTC group identity and the MTC group tunneling use indicator in the session request message and the bearer modification request message, and transmits the messages. The procedure herein is the same as the access procedure for the existing general terminal as described above with reference to FIG. 3.

That is, the MME transmits a session creation request message to the GW and receives a session creation response message (S409). The MME transmits and receives an attach acceptance message and an attach completion message to and from the terminal (S410). Here, the MTC group identity and the MTC group tunneling use indicator of the session creation request message and the attach acceptance message have been set to OFF.

The MME then transmits a bearer modification request message to the GW and receives a bearer modification response message from the GW (S411). Similarly, the MTC group identity and the MTC group tunneling use indicator of the bearer modification request message have been set to OFF. The GW receiving the bearer modification request message from the MME updates a downlink tunnel identity for S1-U downlink traffic transmission and an address of a base station.

If it is determined in the step of determining whether MTC group tunneling is to be used (S403) that MTC group tunneling is to be used for the MTC device making the attach request (Yes in S403), the MME sets the MTC group identity and the MTC group tunneling use indicator to ON, inserts the MTC group identity and the MTC group tunneling use indicator into the session creation request message, transmits the session creation request message to the GW, and receives a session creation response message from the GW (S404).

In order to perform MTC group tunneling for GTP-U downlink tunneling between the base station and the GW, the MME receiving the session creation response message sets the MTC group tunneling use indicator to ON and inserts the MTC group tunneling use indicator into an initial context setup request message. The MME transmits the created initial context setup request message and the attach acceptance message to the base station (S405). The base station allocates and uses a downlink group tunnel identity for MTC group tunneling according to the setting of the group tunneling use indicator included in the initial context setup request message received from the MME.

Then, the MME receives an initial context setup response message from the base station and receives an attach completion message from the MTC device (S406). The MME determines whether an attach attempt is a first attach attempt from the MTC group (S407). If the attach attempt is a first attach attempt from MTC devices in an MTC group to which the MTC device belongs ("Yes" in S407), the MME transmits a bearer modification request message including the MTC group identity, the GTP-U downlink group tunnel identity and the base station address to the GW (S408).

Meanwhile, if the attach request from the MTC device is not a first attach attempt of the group ("No" in S407), the MME does not transmit the bearer modification request message to the GW, and uses an MTC group tunnel identity that is previously set for the MTC group.

FIG. 5 illustrates a group tunneling processing procedure for an MTC device in a GW of a mobile communication system and an initial operation procedure according to an attach request from the MTC device in a data transmission method according to an example embodiment of the present invention.

A GW operation procedure in FIG. 5 will be understood in association with the operation of the MME shown in FIG. 4, particularly, steps 404 and 409.

In an access process of the MTC device, the GW receives a session creation request message including an MTC group identity and a group tunneling indicator from the MME (S501). The GW determines whether the group tunneling use indicator is set to ON or OFF from the received session creation request message (S502).

If the MTC group tunneling use indicator is set to OFF ("No" in S502), the GW creates an EPS bearer context of the MTC device, allocates a tunnel identity to each bearer for each terminal, and transmits a session creation response message to the MME, as in an access procedure of an existing terminal (S506 and S507). Here, a procedure of creating the EPS bearer context of the MTC device includes, for example, allocation of a GTP-U uplink tunnel, creation of a PFT table, and allocation of an IP address to the MTC device.

If the MTC group tunneling use indicator is set to ON ("Yes" in S502), the GW first creates the EPS bearer context of the MTC device (S503) and then determines whether the attach request from the MTC device is a first session creation request of a corresponding MTC group (S504). Here, the creation of the EPS bearer context of the MTC device includes, for example, the creation of the PFT table and the allocation of the IP address of the MTC device.

If it is determined that the attach request from the MTC device is a first session creation request ("Yes" in S504), the GW allocates a GTP-U uplink MTC group tunnel identity (S505), includes the allocated uplink group tunnel identity in the session creation response message, and transmits the session creation response message to the MME (S507).

On the other hand, if it is determined that the attach request is not a first session request of the MTC group ("No" in S504), the GW reuses a previously allocated (first session creation request/response and bearer modification request/response for the group) GTP-U uplink/downlink group tunnel identity.

FIG. 6 illustrates a group tunneling processing procedure for the MTC device in the GW of the mobile communication system and an operation procedure according to a bearer modification request from the MME in the data transmission method according to an example embodiment of the present invention.

An operation procedure of the GW in FIG. 6 will be understood in association with the operation of the MME shown in FIG. 4, particularly, steps 408 and 411.

If the GW receives a bearer modification request message including a group tunneling indicator, a GTP-U downlink tunnel identity and a base station address from the MME according to an access procedure of the MTC device (S601), the GW determines whether an MTC group tunneling use indicator included in the bearer modification request message is set to ON or OFF (S602).

If the MTC group tunneling use indicator is set to OFF ("No" in S602), the GW updates a GTP-U downlink tunnel identity and a base station address of a bearer allocated to each terminal, as in an access procedure for an existing general terminal (S604). The GW then transmits a bearer modification response message to the MME (S605).

Meanwhile, if it is determined in step 602 that the MTC group tunneling use indicator included in the bearer modication request message is set to ON ("Yes" in S602), which indicates that the request is a first bearer modification request in an access process for a corresponding MTC group (if the request is not a first bearer modification request, the bearer modification request message is not received), the GW updates the GTP-U downlink MTC group tunnel identity and the base station address included in the bearer modification request message (S603). The GW then transmits the bearer modification response message to the MME (S605).

The MTC group based tunneling processing method in the mobile communication system according to an example embodiment of the present invention is summarized as follows.

According to example embodiments of the present invention, when the MTC device performs the access procedure, a determination is made as to whether use of group tunneling has been activated for an MTC group to which the MTC device belongs, a tunnel for user traffic transmission is established based on the MTC group according to whether group tunneling is to be used, and then user traffic is differently processed according to whether group tunneling is to be used.

The MME, which is the mobility management entity, determines whether group tunneling is to be used, and an indication indicating whether group tunneling is to be used is included in subscriber information according to the MTC group to which the MTC device belongs. The subscriber information may be received from a home subscriber server (HSS) or the terminal. Alternatively, the MME may directly determine whether group tunneling is to be used according to an attribute of the group.

The attach request message of the MTC device includes at least one unique MTC group identity. Further, the MTC group identity may be included in the session creation request/response message, the initial context setup request/response message, the attach request/response/completion message, and the bearer modification request/response message.

Meanwhile, in the example embodiments of the present invention, the access procedure of the MTC device when the MTC group tunneling use indicator is not set is performed as in an access procedure of an existing person-friendly terminal. Even when the MTC group tunneling use indicator is set, the GTP-U uplink tunnel identity (UL TEID) of the MTC group is first created only if the MTC device making the attach request is a first MTC device in an MTC group to which the MTC device belongs. If the MTC device making the attach request is not a first device in the group, a previously allocated tunnel identity of the MTC group is used.

Even when the MTC group tunneling use indicator is set, the MME does not transmit bearer modification request signaling to the GW if an attach attempt is not a first attach attempt in the MTC group to which the MTC device belongs.

According to an example embodiment of the present invention, if the MTC group tunneling use indicator is set, the base station receives an initial context setup message through S1AP protocol and allocates an MTC group tunnel identity in setting the GTP-U downlink (DL) tunnel.

The example embodiments of the present invention have been described above with reference to FIGS. 4 to 6. However, the present invention is not limited to the above examples. For example, only example embodiments in which the MME sets whether MTC group tunneling is to be used based on the MTC group tunneling use indicator have been introduced in FIGS. 4 to 6. However, if group tunneling is defined in a system to be basically used for MTC service, a separate MTC group tunneling use indicator will be unnecessary, and accordingly, it is to be understood that the flowcharts of FIGS. 4 to 6 may be changed to simpler forms.

While the example embodiments of the present invention and their advantages have been described in detail, it should be understood that various changes, substitutions and alterations may be made herein without departing from the scope of the invention.

What is claimed is:

1. A data transmission method for at least one machine type communication (MTC) device constituting an MTC group, the method comprising:

receiving an attach request from a MTC device;

determining whether the attach request is a first attach request from the MTC group; and if it is determined that the attach request is a first attach request from the MTC group, establishing a downlink tunnel and an uplink tunnel to be used for data transmission and reception between a gateway (GW) and a base station using an MTC group identity, the establishing comprising:

transmitting, by a mobility management entity, a session creation request message to the GW in response to the attach request from the MTC device and receiving a session creation response message from the GW;

transmitting, by the mobility management entity, an initial context setup request message including the MTC group identity to the base station; and allocating, by the base station, an MTC group tunnel identity for downlink data transmission using the MTC group identity included in the initial context setup request message.

2. The method of claim 1, wherein the establishing a downlink tunnel and an uplink tunnel to be used for data transmission and reception between a gateway (GW) and a base station using an MTC group identity comprises:

transmitting, by a mobility management entity receiving the attach request from the MTC device, a session creation request message including the MTC group identity to the GW;

creating, by the GW receiving the session creation request message, a bearer context for the MTC device; and if a session creation request from the MTC device is a first session creation request from the MTC group, allocating, by the GW, an MTC group tunnel identity for uplink data transmission.

3. The method of claim 1, further comprising:

receiving, by the mobility management entity, an initial context setup response message from the base station and receiving an attach completion message from the MTC device;

if the attach request from the MTC device is a first attach request from the MTC group, transmitting, by the mobility management entity, a bearer modification request message to the GW; and updating, by the GW receiving the bearer modification request message, the MTC group tunnel identity and an address of the base station for downlink data transmission.

4. The method of claim 1, further comprising:

determining, by the mobility management entity receiving an attach request message from the MTC device, whether MTC group tunneling is to be used based on information included in the attach request message or previously set information indicating whether group tunneling is to be used according to the MTC group.

5. The method of claim 4, further comprising:

setting, by the mobility management entity, an MTC group tunneling use indicator according to whether the MTC group tunneling is to be used;

inserting, by the mobility management entity, the set MTC group tunneling use indicator into a session creation request message and a bearer modification message and transmitting the session creation request message and the bearer modification message to the GW; and allocating an MTC group tunnel identity for uplink data transmission or updating an MTC group tunnel identity for downlink data transmission, by the GW, according to the MTC group tunneling use indicator included in the session creation request message and the bearer modification message.

6. The method of claim 4, further comprising:

setting, by the mobility management entity, an MTC group tunneling use indicator according to whether the MTC group tunneling is to be used;

inserting, by the mobility management entity, the set MTC group tunneling use indicator into an initial context setup request message and transmitting the initial context setup request message to the base station; and allocating, by the base station, an MTC group tunnel identity for downlink data transmission according to the MTC group tunneling use indicator included in the initial context setup request message.

7. The method of claim 1, wherein the uplink tunnel and the downlink tunnel comprise GPRS tunneling protocol for the user plane (GTP-U) tunnels established between the GW and the base station for each MTC group.

8. The method of claim 1, further comprising:

if it is determined that the attach request is not a first attach request from the MTC group, using a previously set MTC group tunnel identity for the MTC group.

9. A mobile communication system including at least one machine type communication (MTC) device constituting an MTC group and providing an MTC service, the system comprising:

the at least one MTC device configured to transmit an attach request to a network;

a mobility management entity configured to transmit a session creation request message including an MTC group identity to a gateway (GW), transmit an initial context setup request message including the MTC group identity to a base station, wherein the base station is configured to allocate the MTC group tunnel identity for downlink data transmission using the MTC group identity included in the initial context setup request message received from the mobility management entity, and transmit a bearer modification request message to the GW if the attach request from the MTC device is a first attach request from the MTC group; and the gateway configured to receive the session creation request message from the mobility management entity and allocate an MTC group tunnel identity for uplink data transmission if the session creation request is a first session creation request from the MTC group, and to receive the bearer modification request message from the mobility management entity and update an MTC group tunnel identity for downlink data transmission.

10. A mobility management entity located in a mobile communication system, the mobile communication system including at least one machine type communication (MTC) device constituting an MTC group and providing an MTC service, wherein the mobility management entity, which resides on an Evolved Packet Core (EPC) of a core network, receives a network attach request from the at least one MTC device, transmits a session creation request message including an MTC group identity to a gateway (GW), transmits an initial context setup request message including the MTC group identity to a base station, wherein the base station is configured to allocate the MTC group tunnel identity for downlink data transmission using the MTC group identity included in the initial context setup request message received from the mobility management entity, and transmits a bearer modification request message to the GW if the attach request from the MTC device is a first attach request from the MTC group.

11. The mobility management entity of claim 10, wherein the mobility management entity sets an MTC group tunneling use indicator according to whether the MTC group tunneling is to be used, inserts the set MTC group tunneling use indicator in a session creation request message and a bearer modification message to transmit the session creation request message and the bearer modification message to the GW, and inserts the set MTC group tunneling use indicator into an initial context setup request message to transmit the initial context setup request message to the base station.

12. The mobility management entity of claim 10, wherein the mobility management entity determines whether MTC group tunneling is to be used based on information included in the attach request message received from the MTC device or previously set information indicating whether group tunneling is to be used according to the MTC group.

13. A gateway (GW) apparatus located in a mobile communication system, the mobile communication system including at least one machine type communication (MTC) device constituting an MTC group and a mobility management entity, and providing an MTC service, wherein:

the GW apparatus receives a session creation request message from the mobility management entity, and allocates an MTC group tunnel identity for uplink data transmission if the session creation request is a first session creation request from the MTC group, and the GW apparatus receives a bearer modification request message from the mobility management entity and updates an MTC group tunnel identity and an address of a base station for downlink data transmission, wherein the base station is configured to allocate the MTC group tunnel identity for downlink data transmission using the MTC group identity included in the initial context setup request message received from the mobility management entity.

14. The GW apparatus of claim 13, wherein the GW apparatus serves as both a serving GW and a packet data network (PDN) GW.

15. The GW apparatus of claim 13, wherein the GW apparatus allocates the MTC group tunnel identity for uplink data transmission or updates the MTC group tunnel identity for downlink data transmission according to the MTC group tunneling use indicator included in the session creation request message and the bearer modification message.

* * * * *